(12) United States Patent
Carroll et al.

(10) Patent No.: US 7,978,449 B2
(45) Date of Patent: Jul. 12, 2011

(54) INTEGRATED ELECTROSTATIC DISCHARGE (ESD) PROTECTION CIRCUITRY FOR SIGNAL ELECTRODE

(75) Inventors: Kenneth J. Carroll, Los Altos, CA (US); Saurabh Vats, Mountain View, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 685 days.

(21) Appl. No.: 11/948,443

(22) Filed: Nov. 30, 2007

(65) Prior Publication Data

US 2009/0141413 A1    Jun. 4, 2009

(51) Int. Cl.
*H02H 9/00*    (2006.01)
(52) U.S. Cl. ........ 361/56; 361/111; 361/91.1; 361/91.2; 361/91.5; 361/55
(58) Field of Classification Search ............. 361/56, 361/111, 91.1, 91.2, 91.5, 54
See application file for complete search history.

(56) References Cited

U.S. PATENT DOCUMENTS

| | | | |
|---|---|---|---|
| 5,563,757 A | | 10/1996 | Corsi |
| 5,973,897 A | * | 10/1999 | Opris et al. ............... 361/56 |
| 6,204,715 B1 | * | 3/2001 | Sellnau et al. ............ 327/309 |
| 6,900,698 B2 | * | 5/2005 | Ikeda ........................ 330/298 |
| 7,315,438 B2 | * | 1/2008 | Hargrove et al. .......... 361/56 |
| 7,639,463 B2 | * | 12/2009 | Steinhoff et al. .......... 361/56 |
| 2003/0026052 A1 | * | 2/2003 | Spehar et al. .............. 361/56 |
| 2006/0018063 A1 | * | 1/2006 | Boezen et al. ............. 361/56 |
| 2006/0152870 A1 | * | 7/2006 | Chen et al. ................ 361/56 |
| 2007/0253128 A1 | * | 11/2007 | Tiebout et al. ............. 361/56 |

* cited by examiner

*Primary Examiner* — Patrick Salce
(74) *Attorney, Agent, or Firm* — Vedder Price, P.C.

(57) ABSTRACT

An integrated electrostatic discharge (ESD) protection circuitry for a signal electrode. Coupled in shunt between the signal electrode and the positive and negative power supply electrodes are opposing sets of multiple diodes coupled in series. Each set includes a diode across which is applied a nominal reverse bias voltage. These opposing reverse bias voltages are maintained at substantially constant predetermined nominal magnitudes in relation to the voltage at the signal electrode, thereby ensuring minimal leakage current via the signal electrode over the full dynamic range of the signal.

10 Claims, 2 Drawing Sheets

INTEGRATED ELECTROSTATIC DISCHARGE (ESD) PROTECTION CIRCUITRY FOR SIGNAL ELECTRODE

BACKGROUND

1. Field of the Invention

The present invention relates to electrostatic discharge (ESD) protection circuits, and in particular, to ESD protection circuits with reduced leakage currents.

2. Related Art

As is well known, integrated circuits have many semiconductor devices formed on semiconductor chips mounted in packages having multiple pins or electrodes. An ESD event at one or more of the pins of the package can cause a current flow through one or more of the semiconductor devices with such magnitude as to significantly damage or destroy the device. This is particularly true for more sensitive devices such as metal oxide semiconductor (MOS) devices which typically have thin gate oxides.

As is also well known, ESD circuits are often formed with and connected to vulnerable electrodes so as to absorb energy from an ESD event, thereby preventing damage or destruction of semiconductor devices connected such electrode.

A problem that often occurs with such ESD protection circuits, however, is that the introduction of such circuitry creates additional sources of or paths for leakage currents. Such leakage currents can reduce signal-to-noise ratios and dynamic signal operating ranges. This can be particularly true for complementary MOS (CMOS) operational amplifiers with their high input impedances and low input bias currents. With ESD protection diodes connected to the input devices, the resulting leakage reverse bias currents can vary significantly over temperature and semiconductor fabrication processes. This results in circuits having relatively large limits on the input bias current specifications.

SUMMARY

In accordance with the presently claimed invention, an integrated electrostatic discharge (ESD) protection circuitry for a signal electrode is provided. Coupled in shunt between the signal electrode and the positive and negative power supply electrodes are opposing sets of multiple diodes coupled in series. Each set includes a diode across which is applied a nominal reverse bias voltage. These opposing reverse bias voltages are maintained at substantially constant predetermined nominal magnitudes in relation to the voltage at the signal electrode, thereby ensuring minimal leakage current via the signal electrode over the full dynamic range of the signal.

In accordance with one embodiment of the presently claimed invention, integrated electrostatic discharge (ESD) protection circuitry for a signal electrode, including:

first and second power supply electrodes to convey a power supply voltage;

differential amplifier circuitry including first and second input electrodes and an output electrode;

a first plurality of diodes coupled between the first input electrode and the first power supply electrode, and including first and second diodes coupled via a shared electrode;

a second plurality of diodes coupled between the first input electrode and the second power supply electrode, and including third and fourth diodes coupled via the output electrode;

a first resistance coupled between the shared electrode and the second input electrode; and a second resistance coupled between the second input electrode and the output electrode.

In accordance with another embodiment of the presently claimed invention, integrated electrostatic discharge (ESD) protection circuitry for a signal electrode, including:

first and second power supply electrodes to convey a power supply voltage;

a signal electrode to convey a signal;

a first plurality of diodes coupled between the signal electrode and the first power supply electrode, and including first and second diodes coupled via a first shared electrode;

a second plurality of diodes coupled between the signal electrode and the second power supply electrode, and including third and fourth diodes coupled via a second shared electrode;

a plurality of resistances coupled between the first and second shared electrodes, and including first second resistances coupled via a third shared electrode; and differential amplifier circuitry including first and second amplifier inputs and an amplifier output, with the first amplifier input coupled to the signal electrode, the second amplifier input coupled to the third shared electrode and the amplifier output coupled to the second shared electrode.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
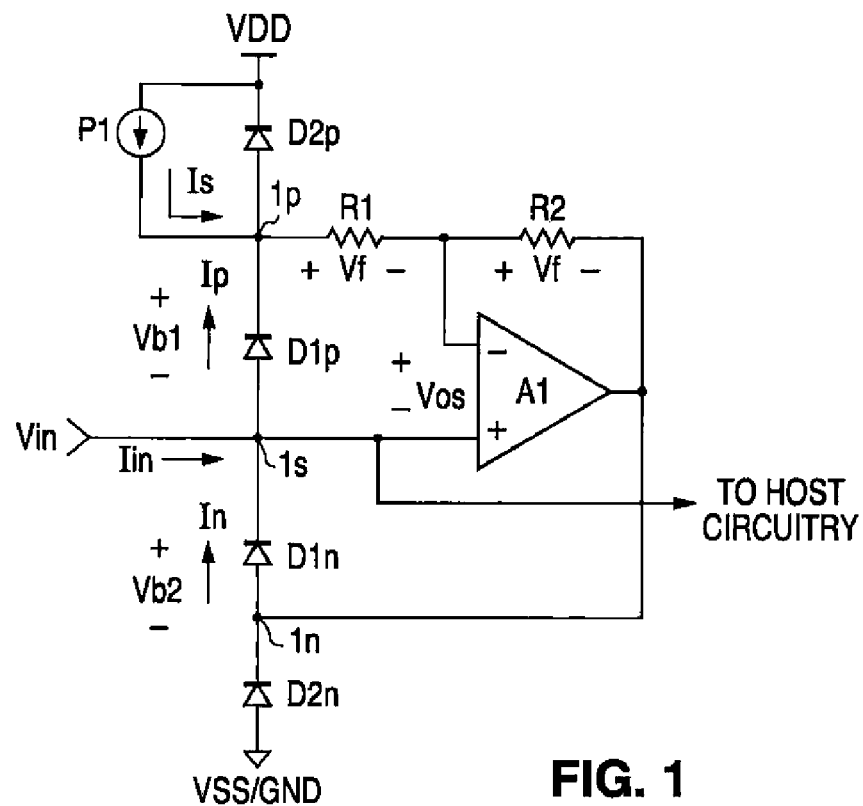
FIG. 1 is a schematic diagram depicting ESD protection circuitry for a signal electrode in accordance with one embodiment of the presently claimed invention.

Referring to FIG. 1, an ESD protection circuit in accordance with one embodiment of the presently claimed invention includes a first set (e.g., two) of diodes D1p, D2p coupling the signal electrode 1s and the positive power supply electrode VDD, a second set (e.g., two) of diodes D1n, D2n coupling the signal electrode 1s to the negative power supply electrode VSS/GND, a differential amplifier A1 (e.g., an operational amplifier), and resistances R1 R2, all interconnected substantially as shown. A current source P1 can also be included to provide a source current Is (discussed in more detail below). The input signal, having a voltage Vin and current Iin, is conveyed via the signal electrode Is to host circuitry elsewhere within the integrated circuit (not shown). The diodes D1p, D2p, D1n, D2n provide ESD protection for the signal electrode 1s in accordance with well known principles. The ESD protection circuitry, comprising the diodes D1p, D2p, D1n, D2n, the amplifier A1 and resistances R1, R2, and preferably the current source P1, provides reverse biasing voltages Vb1, Vb2 across the inner diodes D1p, D1n. This has the effect of matching the reverse bias currents Ip, In for these diodes D1p, D1n. Assuring negligible current into the MOS input of the host circuitry (not shown), as well as the amplifier A1, the input current Iin to the signal electrode 1s will be equal to the difference of the reverse bias currents Ip, In (in accordance with Kirchoff's Current Law). By measuring the voltages Vb1, Vb2 across these diodes D1p, D1n, and verifying that they are at least substantially equal, it can be ensured that the input current Iin due to ESD device leakage is virtually zero.

Figure 2:
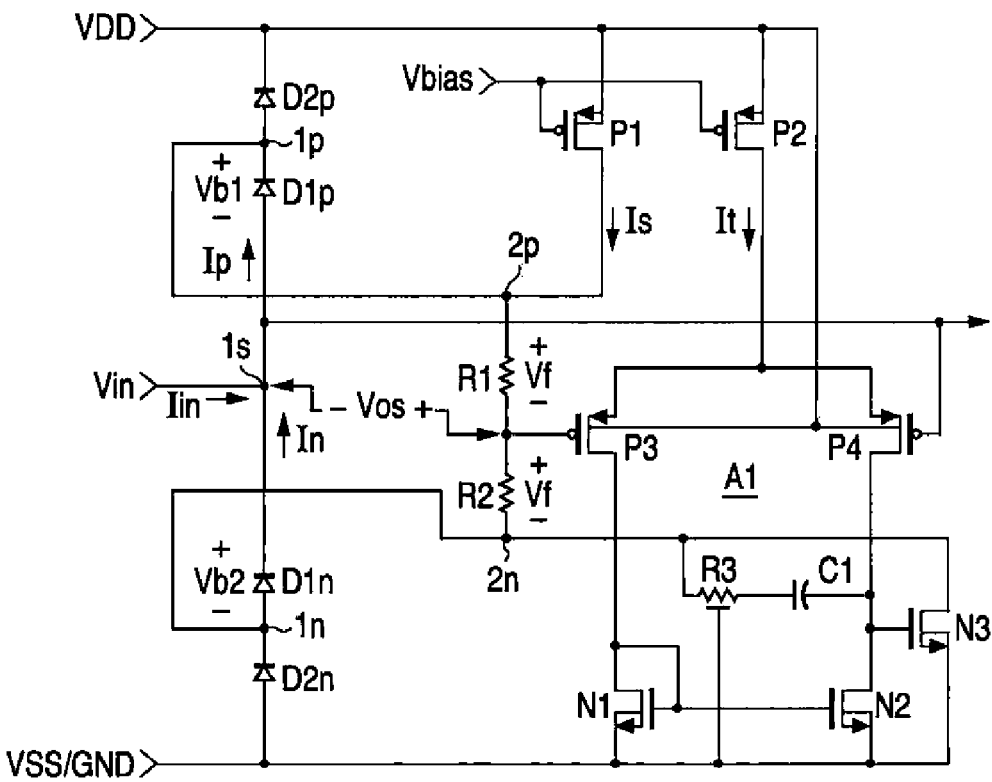
FIG. 2 is a schematic diagram illustrating the circuitry of FIG. 1 in more detail.

Referring to FIG. 2, P-type MOS (PMOS) transistors P3 and P4, and N-type MOS (NMOS) transistors N1 and N2 form the input stage of the amplifier A1, with NMOS transistor N3 forming the output stage. Biasing in the form of a tail current It is provided by PMOS transistor P2, which can be biased by the same voltage Vbias as PMOS transistor P1 that provides the source current Is. As discussed above, nominal reverse bias voltages Vb1, Vb2 are maintained across the inner two diodes D1p, D1n with the resistances R1, R2 and negative feedback loop formed with the amplifier A1.

If the input voltage Vin increases, the gate voltage of transistor P4 increases, thereby also causing the drain voltage of transistor P4 to decrease. This decreasing voltage, which is also the gate voltage of transistor N3, causes the drain voltage of transistor N3 to increase. This increase in voltage "pushes up" both the resistances R1, R2, i.e., causing the voltages at nodes 2p, 2 and 2n to increase relative to the circuit reference VSS/GND. Accordingly, the reverse bias voltages Vb1, Vb2 across the inner diodes D1p, D1n are maintained. Conversely, when the input voltage Vin decreases, the voltages at nodes 2p, 2, 2n are "pulled downs" in a similar manner.

The amplifier A1 needed for this is simple in that it uses small devices. Notwithstanding the input offset voltage Vos, the resistances R1, R12 can be sized such that the voltages Vf across them ensure that the two inner diodes D1p, D1n are maintained in a reverse biased condition. The offset voltage Vos of the amplifier A1 can cause asymmetric reverse bias currents Ip, In through the inner diodes D1p, D1n, thereby causing a higher input current Iin into the input node 1s. However, if probe pads are included at nodes 1p and 1n, then the voltages Vb1, Vb2 across the diodes D1p, D1n can be measured during production. If the measured voltages Vb1, Vb2 are significantly different than the offset voltage Vos, and hence the input current in is too high, the unit can be rejected. A simple limit on the difference in measured voltages Vb1, Vb2 can then be used to guarantee the input current In by design, thereby ensuring a higher quality product.

Assuming the voltages Vf across the resistors are fixed non-zero values, relationships among this voltage Vf, the diode bias voltages Vb1, Vb2, diode threshold voltage Vt and amplifier offset voltage Vos can be expressed as follows:

$$Vb1/Vt = -(Vf+Vos)/Vt \quad (1)$$

$$Vb2/Vt = -(Vf-Vos)/Vt \quad (2)$$

With the use of the resistances R1, R2, the input current IinR can be expresses as follows:

$$IinR = Ip - In \quad (3)$$

$$IinR = Is(e^{Vp/Vt}-1) - Is(e^{Vn/Vt}-1) \quad (4)$$

$$IinR = Is(e^{-(Vf+Vos)/Vt} - e^{-(Vf-Vos)/Vt}) \quad (5)$$

Without the use of the resistances R1, R2, the input current Iin0 can be expressed as follows:

$$Iin0 = Is(e^{-Vos/Vt} - e^{Vos/Vt}) \quad (6)$$

The ratio of the input current with resistances IinR to the input current without resistances Iin0 can then be expressed as follows:

$$\frac{IinR}{Iin0} = \frac{Is * e^{-Vf/Vt}(e^{-Vos/Vt} - e^{Vos/Vt})}{Is(e^{-Vos/Vt} - e^{Vos/Vt})} \quad (7)$$

$$\frac{IinR}{Iin0} = e^{-Vf/Vt} < 1.0 \quad (8)$$

Hence, it can be seen that with the use of the resistances R1, R2, the leakage input current Iin will be less.

Figure 3A:
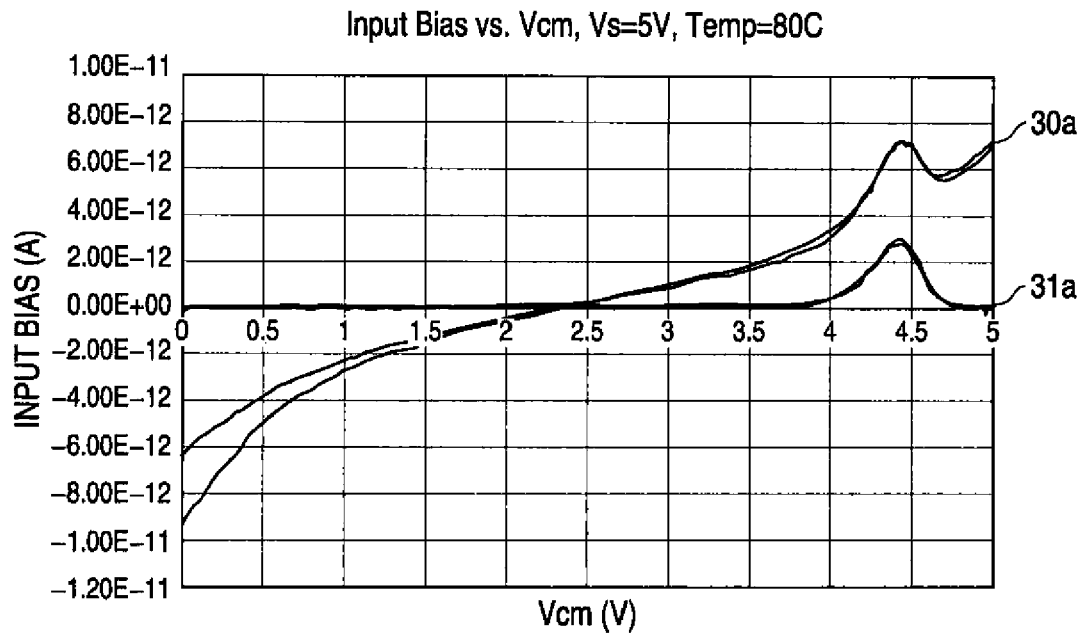
FIGS. 3A and 3B are graphs of input bias current versus common mode voltage based on test versions of the circuit of FIG. 2.
Figure 3B:
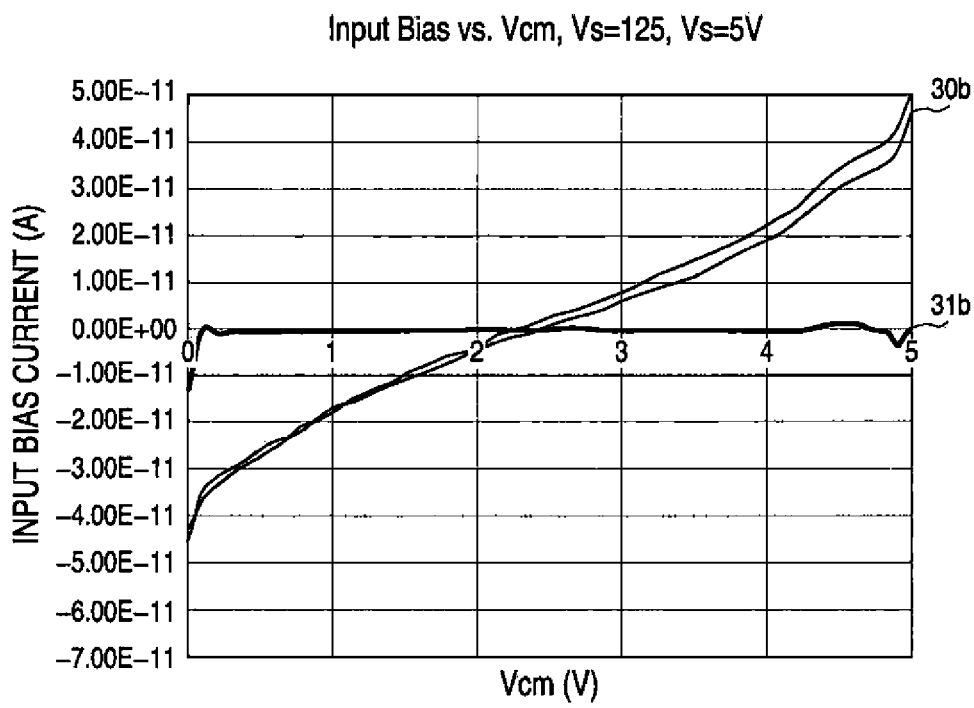

Referring to FIGS. 3A and 3B, some test circuits were measured at elevated temperatures to compare input leakage current Iin of a circuit with conventional ESD protection (i.e., no amplifier providing constant reverse bias for the inner diodes D1p, D1n) and an ESD protection circuit in accordance with the presently claimed invention. As can be seen, the leakage currents 30a, 30b for a conventional ESD protection circuit vary over a much wider range than the currents 31a, 31b for an ESD protection circuit in accordance with the presently claimed invention.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including integrated electrostatic discharge (ESD) protection circuitry for a signal electrode, comprising:

first and second power supply electrodes to convey a power supply voltage;

differential amplifier circuitry including first and second input electrodes and an output electrode;

a first plurality of diodes coupled between said first input electrode and said first power supply electrode, and including first and second diodes coupled via a shared electrode;

a second plurality of diodes coupled between said first input electrode and said second power supply electrode, and including third and fourth diodes coupled via said output electrode;

a first resistance coupled between said shared electrode and said second input electrode; and a second resistance coupled between said second input electrode and said output electrode.

2. The apparatus of claim 1, further comprising current source circuitry coupled to said shared electrode to provide a bias current to said first resistance.

3. The apparatus of claim 1, wherein said differential amplifier circuitry comprises an operational amplifier circuit.

4. The apparatus of claim 1, wherein said first and second input electrodes comprise non-inverting and inverting inputs, respectively, for said differential amplifier circuitry.

5. The apparatus of claim 1, wherein:
said first plurality of diodes
   includes corresponding first pluralities of anode and cathode electrodes with successive ones of said first plurality of diodes mutually coupled via respective ones of said first pluralities of anode and cathode electrodes,
   is coupled to said first input electrode via a first one of said first plurality of anode electrodes, and
   is coupled to said first power supply electrode via a last one of said first plurality of cathode electrodes; and
said second plurality of diodes
   includes corresponding second pluralities of anode and cathode electrodes with successive ones of said second plurality of diodes mutually coupled via respective ones of said second pluralities of anode and cathode electrodes,
   is coupled to said first input electrode via a first one of said second plurality of cathode electrodes, and
   is coupled to said second power supply electrode via a last one of said second plurality of anode electrodes.

6. An apparatus including integrated electrostatic discharge (ESD) protection circuitry for a signal electrode, comprising:
first and second power supply electrodes to convey a power supply voltage;
a signal electrode to convey a signal;
a first plurality of diodes coupled between said signal electrode and said first power supply electrode, and including first and second diodes coupled via a first shared electrode;

a second plurality of diodes coupled between said signal electrode and said second power supply electrode, and including third and fourth diodes coupled via a second shared electrode;
a plurality of resistances coupled between said first and second shared electrodes, and including first second resistances coupled via a third shared electrode; and
differential amplifier circuitry including first and second amplifier inputs and an amplifier output, with said first amplifier input coupled to said signal electrode, said second amplifier input coupled to said third shared electrode and said amplifier output coupled to said second shared electrode.

7. The apparatus of claim 6, further comprising current source circuitry coupled to said first shared electrode to provide a bias current to said first resistance.

8. The apparatus of claim 6, wherein said differential amplifier circuitry comprises an operational amplifier circuit.

9. The apparatus of claim 6, wherein said first and second amplifier inputs comprise non-inverting and inverting inputs, respectively, for said differential amplifier circuitry.

10. The apparatus of claim 6, wherein:
said first plurality of diodes
   includes corresponding first pluralities of anode and cathode electrodes with successive ones of said first plurality of diodes mutually coupled via respective ones of said first pluralities of anode and cathode electrodes,
   is coupled to said signal electrode via a first one of said first plurality of anode electrodes, and
   is coupled to said first power supply electrode via a last one of said first plurality of cathode electrodes; and
said second plurality of diodes
   includes corresponding second pluralities of anode and cathode electrodes with successive ones of said second plurality of diodes mutually coupled via respective ones of said second pluralities of anode and cathode electrodes,
is coupled to said signal electrode via a first one of said second plurality of cathode electrodes, and
   is coupled to said second power supply electrode via a last one of said second plurality of anode electrodes.

* * * * *